(12) United States Patent
Russalian

(10) Patent No.: US 10,591,069 B2
(45) Date of Patent: Mar. 17, 2020

(54) COMPACT ROTARY VALVE BODY FOR COOLANT CONTROL VALVE

(71) Applicant: Schaeffler Technologies AG & Co. KG, Herzogenaurach (DE)

(72) Inventor: Vigel Russalian, Macomb, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 223 days.

(21) Appl. No.: 15/782,047

(22) Filed: Oct. 12, 2017

(65) Prior Publication Data

US 2019/0113143 A1    Apr. 18, 2019

(51) Int. Cl.
| F16K 11/087 | (2006.01) |
| F16K 5/06 | (2006.01) |
| F16K 5/20 | (2006.01) |
| F01P 7/16 | (2006.01) |
| F01P 7/14 | (2006.01) |

(52) U.S. Cl.
CPC ........... *F16K 5/0689* (2013.01); *F01P 7/165* (2013.01); *F16K 5/0605* (2013.01); *F16K 5/201* (2013.01); *F16K 11/0873* (2013.01); *F16K 11/0876* (2013.01); *F01P 7/14* (2013.01); *F01P 2007/146* (2013.01)

(58) Field of Classification Search
CPC ........ F01P 7/165; F16K 5/201; F16K 5/0605; F16K 11/0873; F16K 11/0876
See application file for complete search history.

(56) References Cited

U.S. PATENT DOCUMENTS

| 3,155,368 | A | * | 11/1964 | Shafer | F16K 5/0684 137/246.15 |
| 3,241,808 | A | * | 3/1966 | Allen | F16K 5/0673 137/330 |
| 3,532,320 | A | * | 10/1970 | Fisch | F16K 5/0647 137/329.02 |
| 3,960,363 | A | * | 6/1976 | Domyan | F16K 5/0642 251/174 |
| 4,134,426 | A | * | 1/1979 | Beck | F16K 11/0876 137/625.23 |
| 4,172,583 | A | * | 10/1979 | Wrasnnan | B29C 45/14754 251/172 |
| 4,641,682 | A | * | 2/1987 | Harris | F16K 5/201 137/329.04 |
| 4,651,775 | A | * | 3/1987 | Okada | F16K 5/0605 137/625.3 |
| 4,681,133 | A | * | 7/1987 | Weston | F16K 11/087 137/315.18 |
| 4,778,148 | A |   | 10/1988 | Kruger | |

(Continued)

*Primary Examiner* — Matthew W Jellett
*Assistant Examiner* — Christopher D Ballman
(74) *Attorney, Agent, or Firm* — Matthew V. Evans

(57) ABSTRACT

A coolant control valve is provided that has an outer housing, an actuator, and a fluid flow metering rotary valve body actuated by the actuator. The rotary valve body includes a rotational axis and at least one lobe having a fluid opening. The fluid opening has a first width and a first end. The first width is configured for a first contact face having a first sealing diameter. At least one first support land extends from the first end. The at least one first support land is configured to support a second contact face having a second sealing diameter, the second sealing diameter smaller than the first width.

20 Claims, 4 Drawing Sheets

(56) References Cited

U.S. PATENT DOCUMENTS

| | | | | |
|---|---|---|---|---|
| 4,815,701 A * | 3/1989 | Stone | | F16K 5/0673 |
| | | | | 251/174 |
| 4,928,921 A | 5/1990 | Steele | | |
| 5,016,857 A * | 5/1991 | Bovee | | F16K 5/0605 |
| | | | | 251/209 |
| 5,332,004 A * | 7/1994 | Gethmann | | F16K 5/0605 |
| | | | | 137/625.32 |
| 5,467,796 A * | 11/1995 | Pettinaroli | | F16K 5/0605 |
| | | | | 134/166 C |
| 5,799,695 A * | 9/1998 | Bey | | F16K 5/0605 |
| | | | | 137/625.32 |
| 6,196,262 B1 * | 3/2001 | Giacomini | | A62C 35/60 |
| | | | | 137/559 |
| 6,279,875 B1 * | 8/2001 | Chatufale | | F16K 3/207 |
| | | | | 251/171 |
| 6,966,537 B2 * | 11/2005 | Sundararajan | | F16K 3/0227 |
| | | | | 251/172 |
| 6,974,121 B2 | 12/2005 | Koester et al. | | |
| 6,981,691 B2 * | 1/2006 | Caprera | | F16K 5/0605 |
| | | | | 251/298 |
| 7,111,643 B2 * | 9/2006 | Oh | | F16K 5/0605 |
| | | | | 137/625.41 |
| 7,347,408 B2 * | 3/2008 | Keiser | | F16K 5/0605 |
| | | | | 251/171 |
| 7,412,948 B2 * | 8/2008 | Pipkorn | | F01P 7/167 |
| | | | | 123/41.08 |
| 7,644,840 B2 * | 1/2010 | Held | | B01F 13/1058 |
| | | | | 222/135 |
| 7,694,693 B1 * | 4/2010 | Edelman | | A61F 7/02 |
| | | | | 137/625.3 |
| 8,113,484 B2 * | 2/2012 | Hostetter | | F16K 5/0678 |
| | | | | 251/174 |
| 8,118,277 B2 * | 2/2012 | Cipolla | | F16K 5/0407 |
| | | | | 251/304 |
| 8,366,070 B2 * | 2/2013 | Rimboym | | F16K 5/0605 |
| | | | | 137/625.31 |
| 8,398,055 B2 * | 3/2013 | Yin | | F16K 5/12 |
| | | | | 251/214 |
| 8,727,314 B2 * | 5/2014 | Avdjian | | F16K 5/0684 |
| | | | | 251/315.01 |
| 8,733,733 B2 * | 5/2014 | Collison | | F16K 5/0636 |
| | | | | 251/174 |
| 8,978,691 B2 * | 3/2015 | Avdjian | | F16K 5/0626 |
| | | | | 137/315.19 |
| 9,097,351 B2 * | 8/2015 | Allen | | F16K 5/0605 |
| 9,140,369 B2 * | 9/2015 | Dalluge | | F16K 5/0678 |
| 9,206,668 B2 * | 12/2015 | Wood | | E21B 29/04 |
| 9,341,273 B2 | 5/2016 | Grabau | | |
| 9,500,299 B2 * | 11/2016 | Morein | | F16K 11/0876 |
| 9,669,207 B2 * | 6/2017 | Ueda | | F16K 11/0873 |
| 9,903,481 B2 * | 2/2018 | Keller | | F16K 47/02 |
| 10,060,538 B2 * | 8/2018 | Corte, Jr. | | F16K 5/0642 |
| 2001/0030309 A1 * | 10/2001 | Carlson | | F16K 5/12 |
| | | | | 251/209 |
| 2002/0109118 A1 * | 8/2002 | Brinks | | F16K 5/0605 |
| | | | | 251/209 |
| 2004/0164496 A1 * | 8/2004 | Okada | | F02M 59/442 |
| | | | | 277/549 |
| 2011/0147635 A1 * | 6/2011 | Seveso | | F16K 5/0678 |
| | | | | 251/315.08 |
| 2011/0309280 A1 * | 12/2011 | Wincek | | F16K 5/0605 |
| | | | | 251/315.01 |
| 2012/0037833 A1 * | 2/2012 | Miyazaki | | B65G 53/4658 |
| | | | | 251/366 |
| 2014/0332704 A1 * | 11/2014 | Yli-Koski | | F16K 1/225 |
| | | | | 251/127 |
| 2016/0109031 A1 | 4/2016 | Greene | | |
| 2016/0334023 A1 * | 11/2016 | Fang | | F16K 5/0647 |
| 2018/0030881 A1 * | 2/2018 | Carter | | F01P 11/20 |
| 2018/0119838 A1 * | 5/2018 | Brazas | | F01P 7/16 |
| 2018/0259076 A1 * | 9/2018 | Feng | | F16K 11/0876 |
| 2019/0017612 A1 * | 1/2019 | Ikemoto | | F01P 7/14 |

* cited by examiner

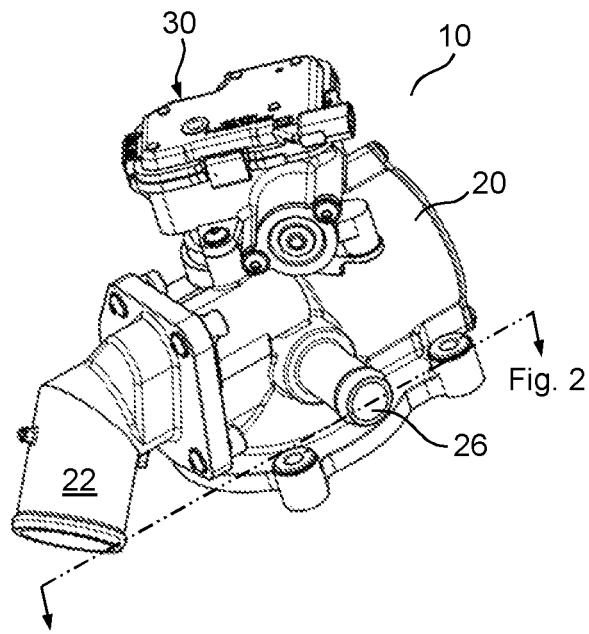
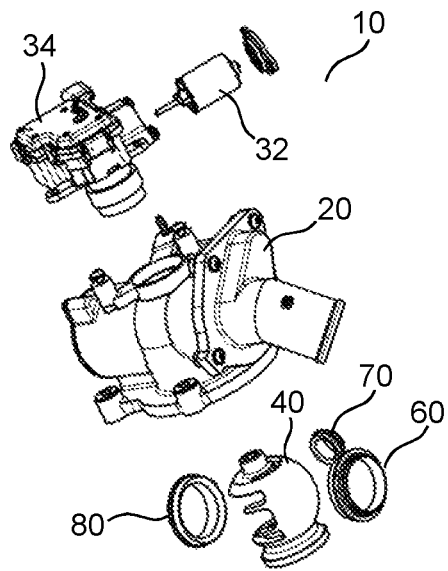
Figure 1A
Figure 1B
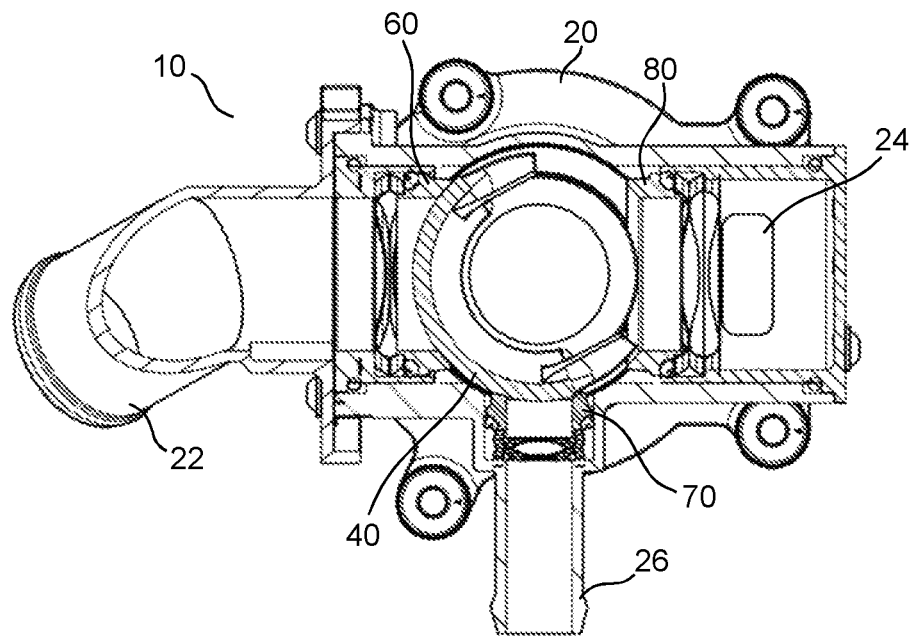
Figure 2

COMPACT ROTARY VALVE BODY FOR COOLANT CONTROL VALVE

TECHNICAL FIELD

Example aspects described herein relate to rotary valve bodies for coolant control valves used within fluid cooling systems of vehicular powertrains.

BACKGROUND

As fuel economy gains importance in the transportation industry, efforts have increased to achieve higher internal combustion (IC) engine efficiencies and to seek alternative powertrains. Coolant control valves (CCVs) can be arranged to provide coolant flow control for temperature management of various powertrain components including IC engines, transmissions and various components of hybrid electric and fuel cell vehicles.

A portion of CCVs are electro-mechanical in design, incorporating an actuator assembly that interfaces with a mechanical rotary valve body to provide a controlled flow of coolant to a selected powertrain component or system via one or more fluid flow ports. An electric motor, controlled by the engine control unit, is often employed within an actuator assembly of the CCV to achieve a desired angular position of the rotary valve body. A transmission or gear train can be utilized between the electric motor and rotary valve body. The rotary valve body, in some instances a complex multi-lobed design, and an outer housing of the CCV are often constructed of plastic and manufactured by an injection molded process.

Fluid openings configured within a rotary valve body meter the amount of fluid flow to or from a CCV, providing variable flow to different segments of a cooling system via one or more inlets or outlets arranged within an outer housing of the CCV. The fluid opening can be of many different forms to achieve a desired flow rate. Typically, as overlap increases or decreases between the fluid opening and the inlet or outlet, fluid flow can be increased or decreased, respectively. For CCVs that manage fluid flow through multiple fluid openings and passages, it can be difficult to create a design that packages within a prescribed space of a vehicular system.

SUMMARY

A coolant control valve (CCV) is provided that has an outer housing, an actuator, and a fluid flow metering rotary valve body actuated by the actuator. The rotary valve body includes a rotational axis and at least one lobe having a fluid opening. The fluid opening has a first width and a first end. The first width is configured for a first contact face having a first sealing diameter and at least one first support land extends from the first end. The at least one first support land is configured for supporting a second contact face having a second sealing diameter, with the second sealing diameter being smaller than the first width.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

FIG. 1A is a perspective view of an example embodiment of a coolant control valve (CCV) having a compact rotary valve body.

FIG. 1B is an exploded perspective view of the CCV of FIG. 1A, showing the compact rotary valve body and first, second, and third seal bodies.

FIG. 2 is a cross-sectional view taken from FIG. 1A.

DETAILED DESCRIPTION OF THE EMBODIMENTS

Figure 3:
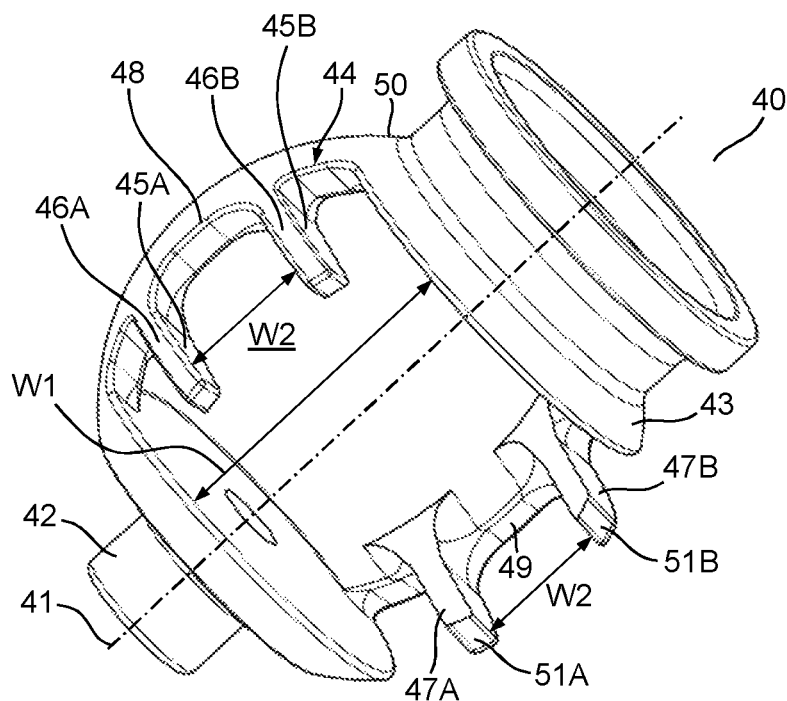
FIG. 3 is a perspective view of the compact rotary valve body of FIG. 1B.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left", "right", "up", "upward", "down", and "downward" designate directions in the drawings to which reference is made. The terminology includes the words specifically noted above, derivatives thereof, and words of similar import.

Figure 7:
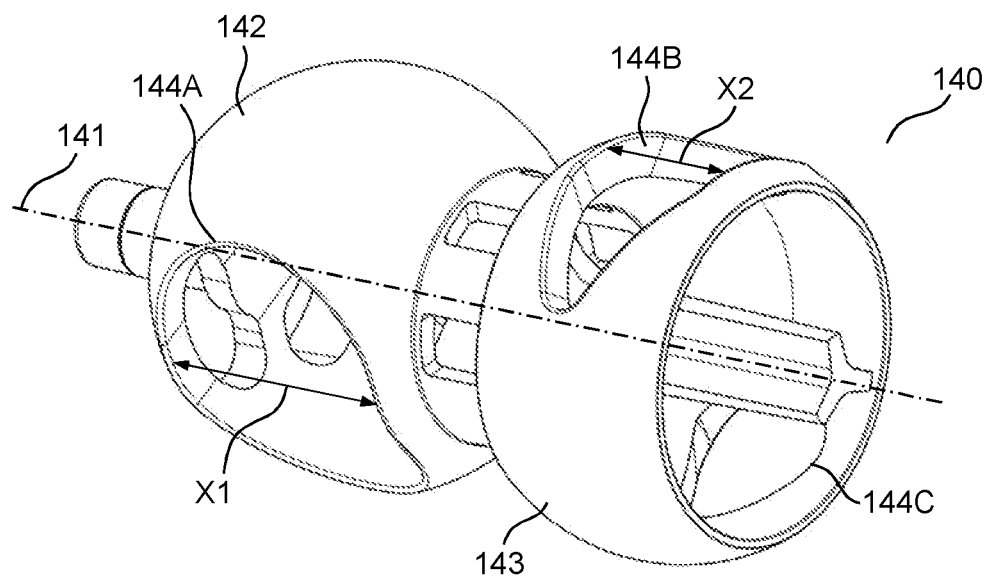
FIG. 7 is a perspective view of a prior art rotary valve body.

FIG. 7 shows a prior art rotary valve body 140 that has a rotational axis 141, a first lobe 142 with a first fluid opening 144A, and a second lobe 143 with a second 144B and a third 144C fluid opening. The first fluid opening 144A has a width X1 larger than a width X2 of the second fluid opening due to differences in design flow rates. The rotary valve body 140 facilitates metered fluid flow through the three fluid openings 144A-C with the two axially adjacent lobes 142, 143. The two axially adjacent lobes 142, 143 lengthen the rotary valve body 140, which, not only increases coolant control valve (CCV) packaging, but also increases design complexity and associated injection mold tooling costs of the rotary valve body 140 and outer housing (not shown) that surrounds the rotary valve body 140.

Figure 4:
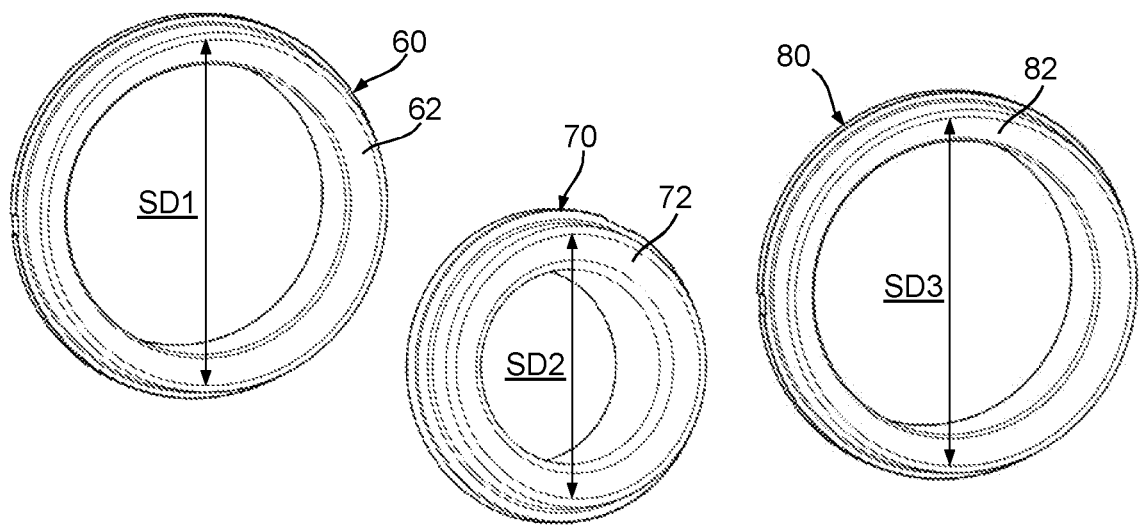
FIG. 4 is a perspective view of the first, second, and third seal bodies shown in FIG. 1B.
Figure 5A:
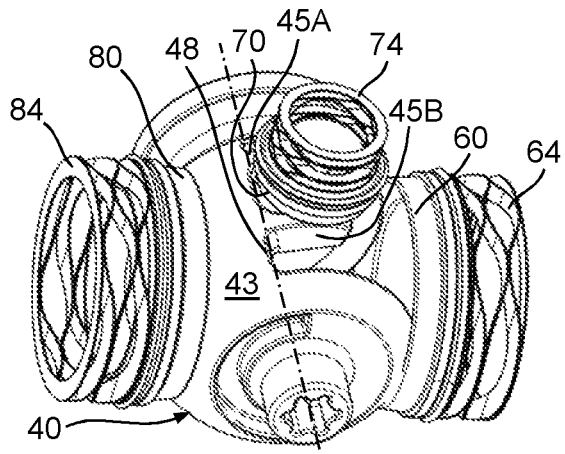
FIGS. 5A-5C are perspective views of the compact rotary valve body of FIG. 1B in three different rotational positions, together with first, second, and third seal bodies and their respective optional resilient elements.
Figure 5B:
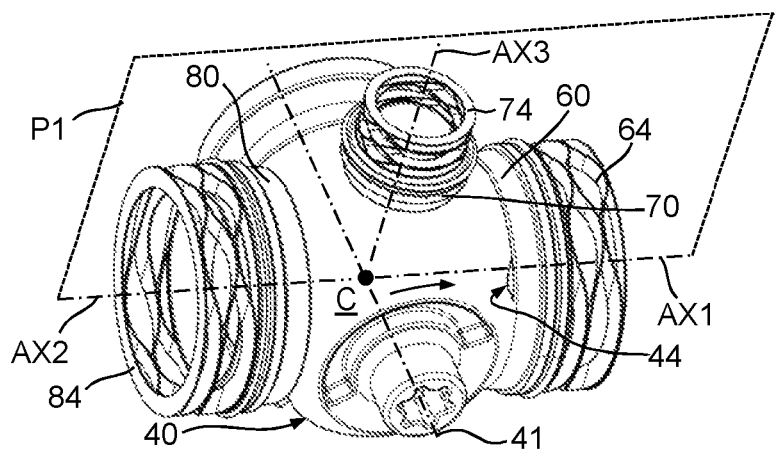
Figure 5C:
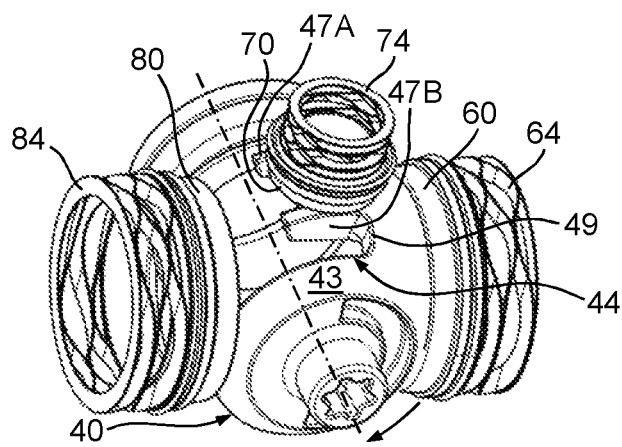

FIGS. 1A and 1B show perspective and exploded perspective views, respectively, of a CCV 10 having an example embodiment of a compact rotary valve body 40; FIG. 2 shows a cross-sectional view of the CCV of FIG. 1A. FIG. 3 shows a perspective view of the rotary valve body 40. FIG. 4 shows a perspective view of a first seal body 60, a second seal body 70, and a third seal body 80. FIGS. 5A through 5C shows the rotary valve body 40 in three different rotational positions with respect to the first seal body 60, second seal body 70, and third seal body 80, and respective optional first resilient element 64, second resilient element 74, and third resilient element 84. The following description should be read in light of FIGS. 1A through 5C. The CCV 10 includes an actuator assembly 30, an outer housing 20, the rotary valve body 40, the first seal body 60, the second seal body 70, the third seal body 80 and respective optional resilient elements 64, 74, 84. The outer housing 20 includes a first inlet 22, a second inlet 24, and an outlet 26. The term "inlet" represents any form of a fluid entrance to the outer housing 20, and the term "outlet" represents any form of a fluid exit from the outer housing 20. Different forms, configurations and number of inlets and outlets on the outer housing 20 are possible. For example, a single inlet and multiple outlets could be arranged on the outer housing 20 of the CCV 10. Furthermore, the inlets and outlets could be formed as ports or tubular-type protrusions in order to facilitate incoming or outgoing fluid flow. The first seal body 60 is arranged in the first inlet 22, the second seal body 70 is arranged in the outlet 26, and the third seal body 80 is arranged in the second inlet 24. The actuator assembly 30 includes an actuator housing 34 and an actuator 32. As shown, the actuator 32 can be in the form of an electric motor, however, many different types of actuators are possible. Additionally, the actuator housing 34 could be eliminated by integrating a space within the outer housing 20 of the CCV 10 to package the actuator 32.

The rotary valve body 40 includes a rotational axis 41, an actuator interface 42, and a fluid opening 44 having a first width W1. The first seal body 60 and the third seal body 80 are sized to seal against an outer surface 43 that surrounds the fluid opening 44 of the rotary valve body 40 to prevent or minimize fluid leakage between rotary valve body 40 and the first seal body 60 and the third 80 seal body. Minimized fluid leakage provides precise fluid flow control of the CCV 10. While the outer surface 43 is shown as being spherical in form, any form is possible that facilitates a functional rotary valve body. The first width W1 together with the first seal body 60 and the first inlet 22 achieve a design flow rate of incoming fluid into the CCV 10. The first seal body 60, is configured with a first contact face 62 having a first sealing diameter SD1 to sealingly engage the outer surface 43 of the rotary valve body 40. The "sealing diameter" is defined as a measure of an outer diameter of a contact face. The optional first resilient element 64 provides a force that acts upon the first seal body 60 to enhance its seal with the outer surface 43; therefore, the first seal body 60 forcibly engages the outer surface 43 of the rotary valve body 40. The first resilient element 64 could take the form of any force generating device such as a spring (as shown) or elastomer, however, it is not limited to these component forms. The third seal body 80 is configured with a third contact face 82 having a third sealing diameter SD3 to also sealingly engage the outer surface 43 of the rotary valve body 40. The first width W1 of the fluid opening 44 together with the third seal body 80 and the second inlet 24 achieve a design flow rate of incoming fluid to the CCV 10. The optional second resilient element 74 provides a force that acts upon the second seal body 70 to enhance its seal with the outer surface 43.

Typically, the first width W1 of the fluid opening 44 can rotationally accommodate multiple inlets and/or outlets that have a seal body that is configured with contact faces having sealing diameters larger than the first width W1. The first sealing diameter SD1 of first contact face 62 of the first seal body 60 arranged within the first inlet 22 is greater than the first width W1 of the fluid opening 44; and, the third sealing diameter SD3 of the third contact face 82 of the third seal body 80 arranged within the second inlet 24 is greater than the first width W1 of the fluid opening 44. As the rotary valve body 40 rotates throughout its entire rotational range, at least a portion of the first seal body 60 and the third seal body 80, or, more particularly, their respective first contact face 62 and third contact face 82, are sealingly supported by the outer surface 43 of the rotary valve body 40.

In order to minimize packaging space of the CCV 10, the first inlet 22, second inlet 24, and the outlet 26 utilize the respective seal bodies 60, 70, 80 that are circumferentially arranged around a single lobe 50 of the rotary valve body 40. This arrangement minimizes the size of the rotary valve body 50, which reduces design complexity and associated manufacturing costs. Placement of the first seal body 60, the second seal body 70, and the third seal body 80 in an arrangement where their respective first central axis AX1, second central axis AX2, and third central axis AX3 lie on a same plane P1 can more easily accommodate a single-lobed rotary valve body. Additionally, arranging these three central axes AX1, AX2, AX3 so that they intersect the rotational axis 41 of the rotary valve body 40 at a common intersection point C can further accommodate a single-lobed rotary valve body.

Figures 6A, 6B:
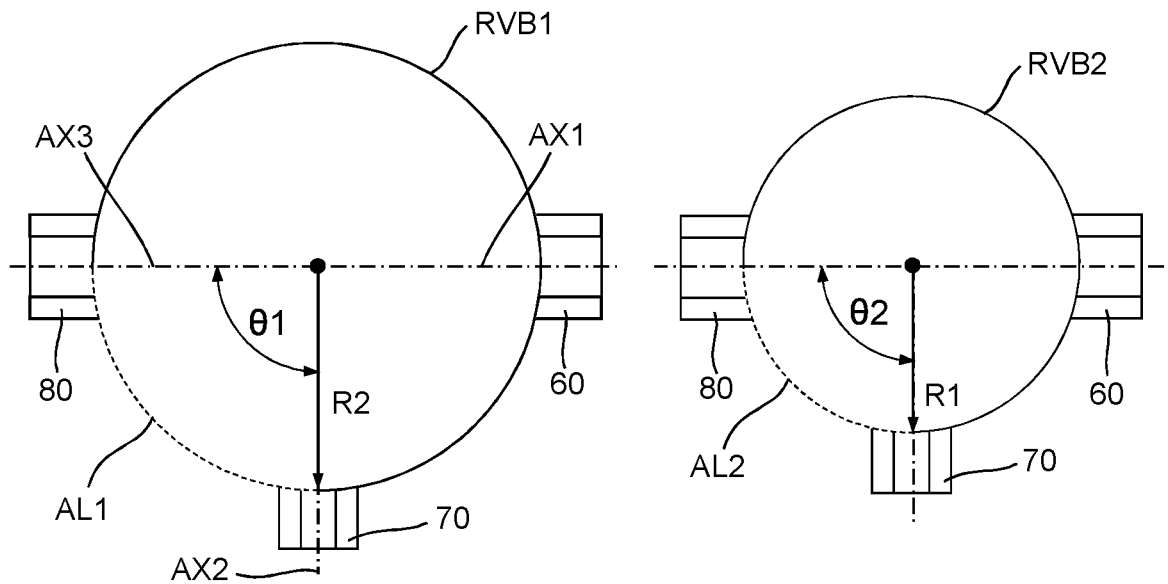
FIGS. 6A-6B are schematic end views of two different rotary valve body radii together with the three seal bodies of FIG. 4.

The arrangement of all three seal bodies 60, 70, 80 around the single lobe 50 of the rotary valve body 40 provides a challenge for fluid opening packaging. Referring now to FIGS. 6A and 6B, schematic end views of the first seal body 60, second seal body 70, and third seal body 80 are shown together, respectively, with a first radius R1 of a first rotary valve body RVB1, and a second radius R2 of a second rotary valve body RVB2, with the second radius R2 smaller than the first radius R1. Arc length AL of a circle can be represented by the following mathematical formula:

$$AL = R \times \theta$$

where: AL=arc length
R=radius
θ=angle (radians)

Referring to FIG. 6A, a first arc length AL1 of the first rotary valve body RVB1 is shown that spans from the second central axis AX2 of the second seal body 70 to the third central axis AX3 of the third seal body 80. Comparatively, FIG. 6B shows a second arc length AL2 that also spans from the second central axis AX2 of the second seal body 70 to the third central axis AX3 of the third seal body 80. Those that are skilled in the art of rotary valve bodies know that a rotary valve body can be formed in many different circular shapes including, but not limited to, that of a sphere or a cylinder. Given that the arc length AL of a circle is directly proportional to its radius R, a larger radius, such as RVB1, yields a larger first arc length AL1 compared to a smaller radius, such as RVB2, which yields a smaller arc length AL2; therefore, a larger rotary valve body radius will yield a larger arc length between two seal bodies (or contact surfaces, if seal bodies are not used) that are placed 90° apart as shown in FIGS. 6A and 6B, offering more potential circumferential space (defined by arc length) for adjacent fluid openings. However, a smaller rotary valve body radius R facilitates a packaging-friendly outer housing, reducing a CCV's packaging space.

The outlet 26 of the CCV 10 is designed for a lower fluid flow rate than the first inlet 22 and the second inlet 24. This is accomplished by smaller fluid flow areas through which fluid flows. The flow area provided by the second seal body 70 and the outlet 26 is smaller compared to flow areas of the first seal body 60 and the third seal body 80 and their respective first inlet 22 and second inlet 24. In order to minimize the radius of the rotary valve body 40 and to incorporate a fluid opening strategy for the first inlet 22, second inlet 24, and the outlet 26 all on a single lobe, a unique form of the fluid opening 44 is utilized, as shown in FIG. 3. The fluid opening 44 includes: A). A first support land 45A and a second support land 45B that extend from a first end 48 and spaced apart by a second width W2 smaller than the first width W1, are configured for supporting the second contact face 72 (with its second sealing diameter SD2) arranged within the second seal body 70, and; B). A third support land 47A and a fourth support land 47B that extend from a second end 49 and spaced apart by a second width W2 smaller than the first width W1, are also configured for supporting the second contact face 72 (with its second sealing diameter SD2) arranged within the second seal body 70. The first 45A and second 45B support lands provide support of the second contact face 72 as it overlaps the first end 48 of the fluid opening 44, facilitating flow from the first inlet 22 to the outlet 26. The third support land 47A and fourth support land 47B provide support of the second contact face 72 while it overlaps the second end 49 of the fluid opening 44, facilitating flow from the second inlet 24 to the outlet 26. The presence of the first support land 45A, second support land 45B, third support land 47A, and fourth support land 47B facilitates use of the single fluid opening 44 together with the second seal body 70 configured with its second sealing diameter SD2 that is smaller than the first width W1 of the fluid opening 44, to manage flows from the first inlet 22 and second inlet 24.

While seal bodies are utilized in the figures, the three previously discussed contact faces 62, 72, 82 with their respective sealing diameters SD1, SD2, SD3 could also be formed within the outer housing 20 or take on other forms that what is shown in the figures, potentially eliminating the use of seal body components.

The first support land 45A and second support land 45B are configured with respective first land outer surface 46A and second land outer surface 46B that are curved in form such that they are cospherical with the outer surface 43 of the lobe 50 to potentially sealingly engage with the second contact face 72 of the second seal body 70. The support lands 45A-B, 47A-B can be formed with distal ends, such as the distal ends 51A, 51B shown on the respective third support land 47A and fourth support land 47B, however, many different forms not shown in the figures are also possible. For example, an optimized location of the first support land 45A at the first end 48 of the fluid opening 44 may provide adequate support for the first contact face 62 of the first seal body 60, eliminating a need to have the second support land 45B.

FIGS. 5A through 5C show three rotational positions of the rotary valve body 40 moving clockwise with respect to the first seal body 60, second seal body 70, and third seal body 80. In a first rotational position shown in FIG. 5A, the first seal body 60 and its first contact face 62 (shown in FIG. 4) overlap the fluid opening 44 such that the first seal body 60 is supported by the outer surface 43 of the rotary valve body 40. In addition, the second contact face 72 (shown in FIG. 4) of the second seal body 70 is engaged with the first 45A and second 45B support lands that extend from the first end 48 of the fluid opening 44, which facilitates overlap between the fluid opening 44 and the second contact face 72. In this orientation, fluid flow occurs from the first inlet 22 to the outlet 26. As the rotary valve body 40 rotates clockwise, a second rotational position shown in FIG. 5B is achieved. In this second rotational position, the fluid opening 44 overlaps with the first seal body 60 and its corresponding first contact face 62, permitting fluid flow from the first inlet 22 to the rotary valve body 40. However, no overlap occurs between the fluid opening 44 and the second contact face 72 of the second seal body 70 in this second rotational position, therefore, no fluid flow occurs through the outlet 26 within which the second seal body 70 is arranged. In a third rotational position shown in FIG. 5C, the second seal body 70 is engaged and supported by the third support land 47A and fourth support land 47B that extend from the second end 49 of the fluid opening 44. In this third rotational position, the fluid opening 44 overlaps both the second contact face 72 and third contact face 82 of the respective second seal body 70 and third seal body 80, permitting fluid flow to occur from the second inlet 24 to the outlet 26.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What we claim is:
1. A rotary valve body comprising:
 a rotational axis; and,
 at least one lobe having:
  a fluid opening with a first width configured for a first contact face having a first sealing diameter;
  the fluid opening having at least one first support land extending from a first end;
  the at least one first support land configured for supporting a second contact face having a second sealing diameter;
  the second sealing diameter smaller than the first width; and,
  the fluid opening configured to rotate relative to the first and second contact faces.
2. The rotary valve body of claim 1, wherein the at least one first support land is comprised of a first and a second support land spaced apart by a second width smaller than the first width.
3. The rotary valve body of claim 1, further comprising at least one second support land extending from a second end of the fluid opening, the at least one second support land configured for supporting the second contact face.
4. The rotary valve body of claim 3, wherein the at least one second support land is comprised of a third and a fourth support land spaced apart by a second width smaller than the first width.

5. The rotary valve body of claim 1, wherein the at least one first support land has at least one distal end.

6. The rotary valve body of claim 5, further comprising an actuator interface.

7. The rotary valve body of claim 1, including:
a first rotational position of the rotary valve body, wherein the fluid opening is configured to overlap the first contact face and the second contact face; and,
a second rotational position of the rotary valve body, wherein the fluid opening is configured to overlap the first contact face, and not overlap the second contact face.

8. A coolant control valve, comprising:
an outer housing;
an actuator; and,
a rotary valve body actuated by the actuator; the rotary valve body having:
a rotational axis; and,
at least one lobe having:
a fluid opening with a first width configured for a first contact face having a first sealing diameter;
the fluid opening having at least one first support land extending from a first end;
the at least one first support land configured for supporting a second contact face having a second sealing diameter;
the second sealing diameter smaller than the first width; and,
the fluid opening configured to rotate relative to the first and second contact faces.

9. The coolant control valve of claim 8, further comprising at least one seal body configured with at least one of the first and second contact faces.

10. The coolant control valve of claim 9, wherein the at least one seal body is forcibly engaging an outer surface of the rotary valve body.

11. The coolant control valve of claim 10, further comprising at least one resilient element that forcibly engages the at least one seal body to an outer surface of the rotary valve body.

12. The coolant control valve of claim 9, wherein a first seal body is configured with the first contact face, and a second seal body is configured with the second contact face.

13. The coolant control valve of claim 8, wherein the at least one first support land forms a curved land outer surface that supports the second contact face.

14. The coolant control valve of claim 13, wherein the curved land outer surface is configured to seal with the second contact face.

15. The coolant control valve of claim 14, wherein the curved land outer surface is cospherical with an outer surface of the at least one lobe.

16. The coolant control valve of claim 8, wherein the outer housing comprises at least one inlet and at least one outlet.

17. The coolant control valve of claim 16, wherein a first central axis of the at least one inlet and a second central axis of the at least one outlet are coplanar.

18. The coolant control valve of claim 17, wherein the first and second central axes intersect a rotational axis of the rotary valve body at a common intersection point.

19. The coolant control valve of claim 8, wherein the rotary valve body is configured with a single lobe.

20. The coolant control valve of claim 19, wherein the single lobe is spherical.

* * * * *